June 5, 1962  R. DEFLANDRE  3,037,430
MILLING AND BORING MACHINE
Filed April 28, 1959   13 Sheets-Sheet 1

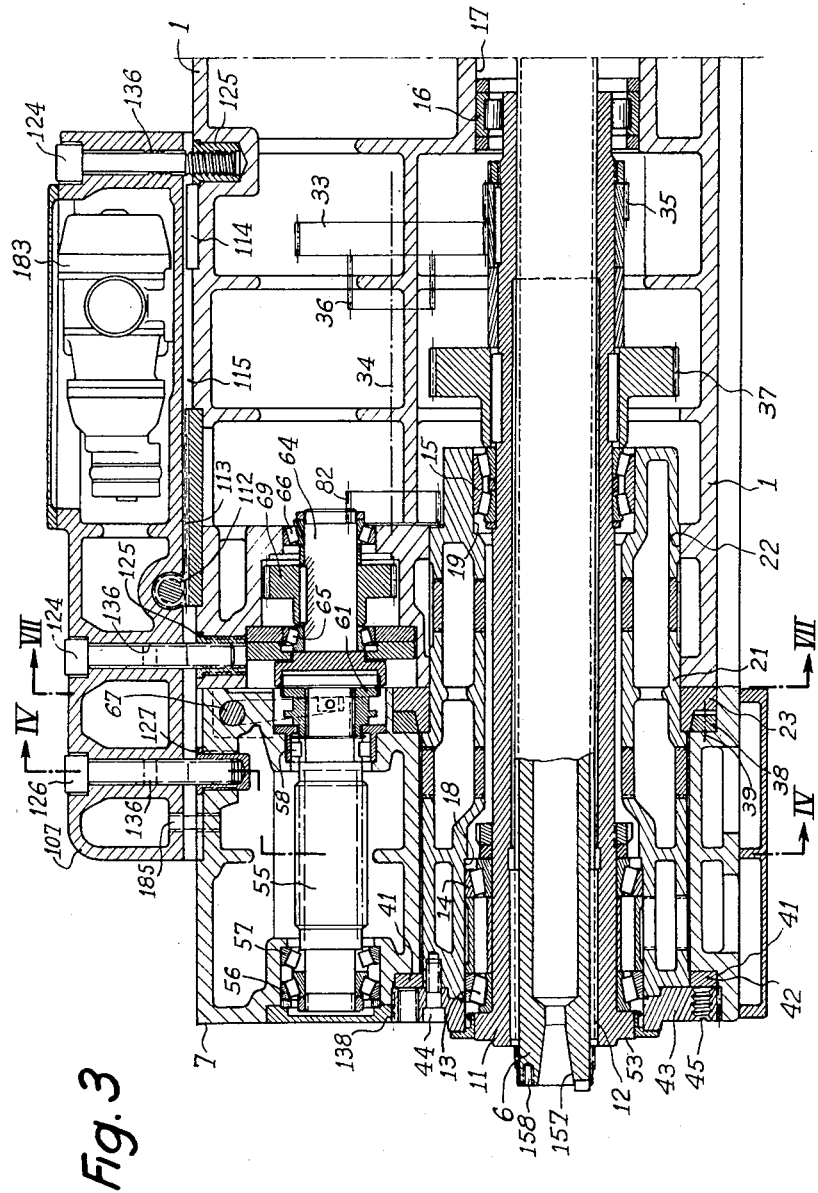

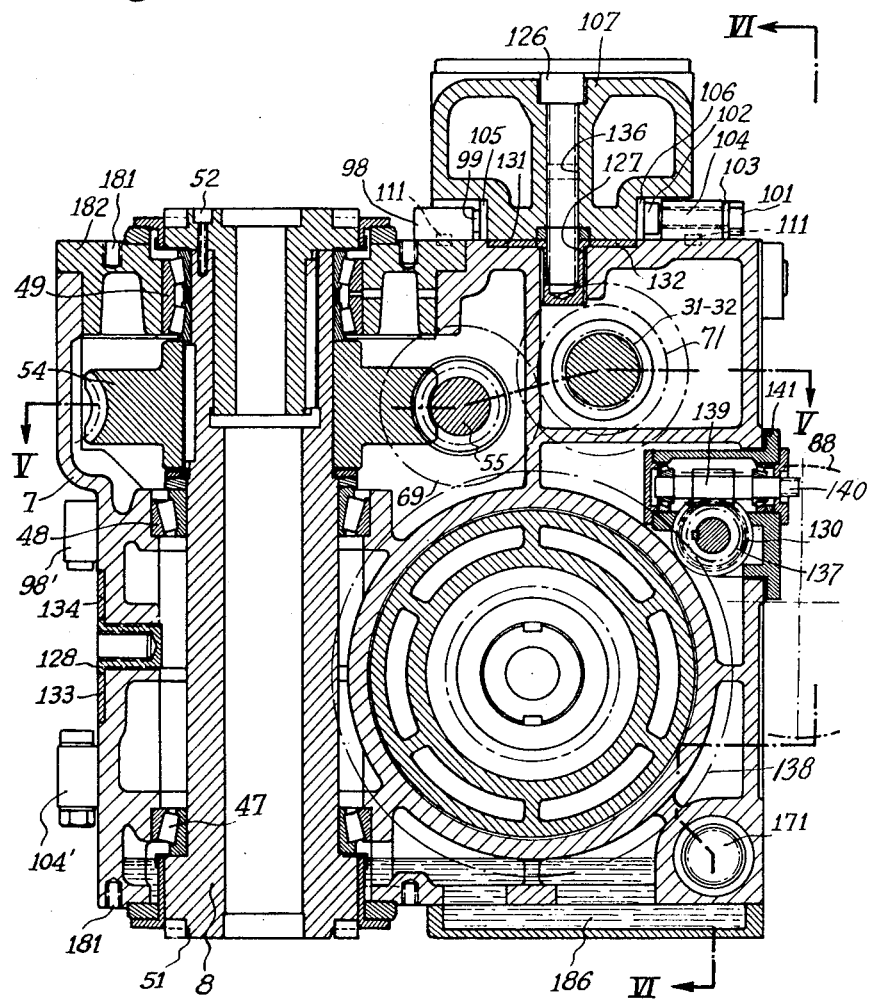

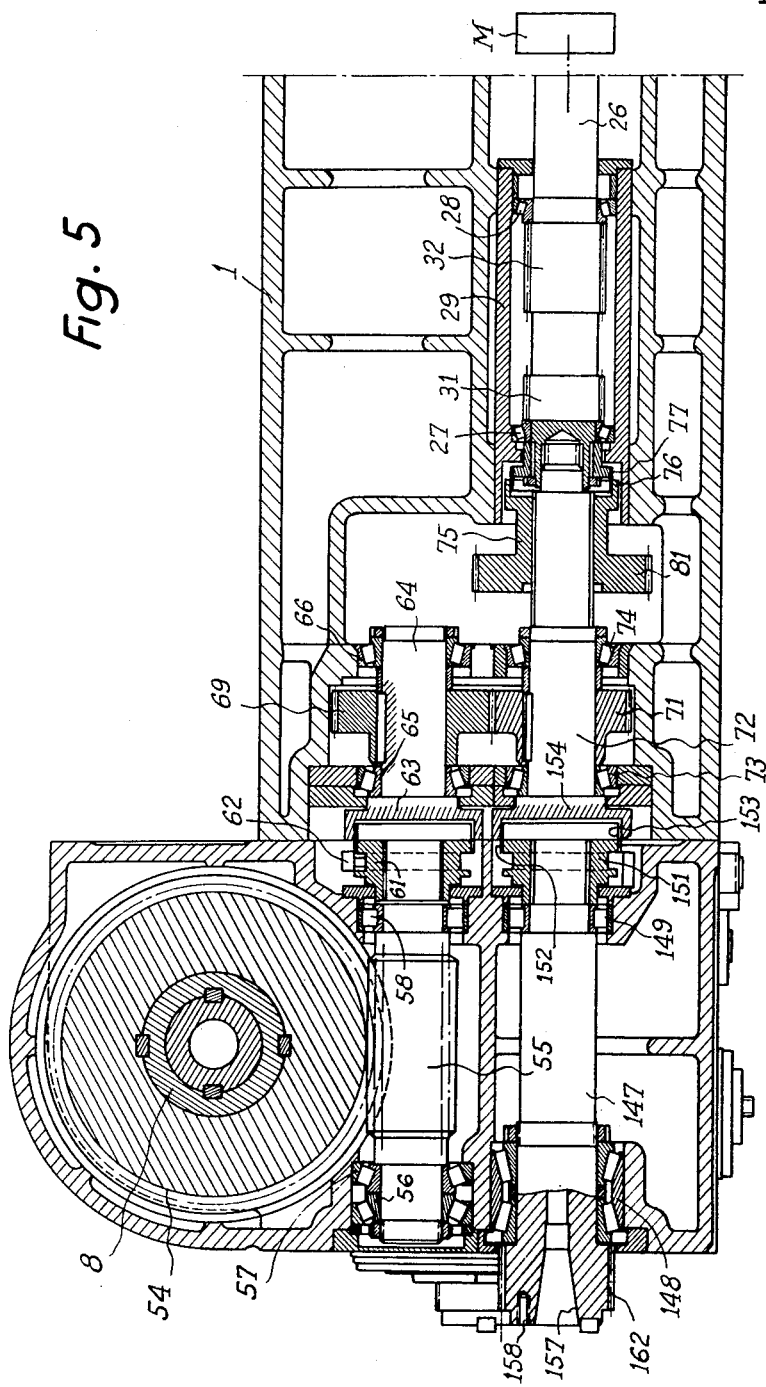

June 5, 1962    R. DEFLANDRE    3,037,430
MILLING AND BORING MACHINE
Filed April 28, 1959    13 Sheets-Sheet 6

June 5, 1962  R. DEFLANDRE  3,037,430
MILLING AND BORING MACHINE
Filed April 28, 1959  13 Sheets-Sheet 8

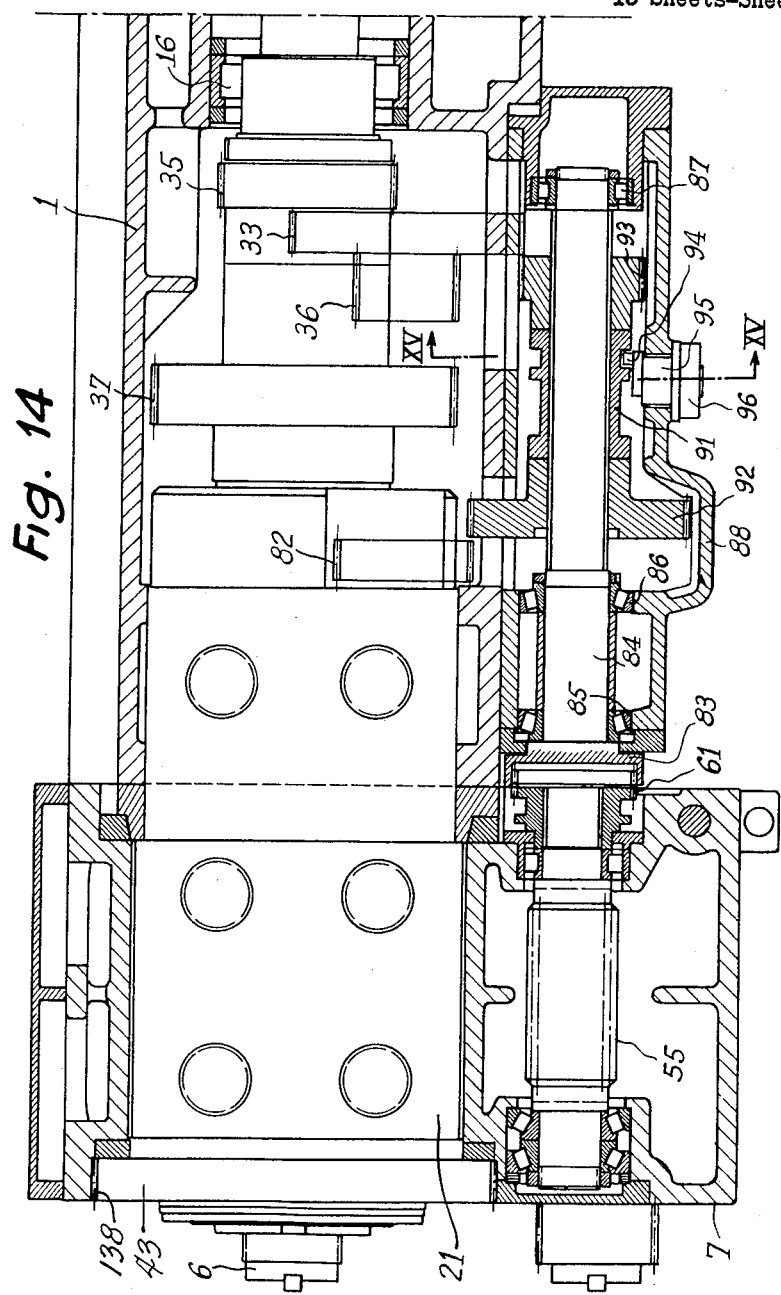

ന
3,037,430
MILLING AND BORING MACHINE
René Deflandre, Paris, France, assignor to Société dite: Derefa, Etablissements pour le Developpement, Recherches et Fabrications Industrielles, Vaduz, Liechtenstein
Filed Apr. 28, 1959, Ser. No. 809,546
Claims priority, application France Apr. 28, 1958
11 Claims. (Cl. 90—17)

This invention relates to milling and boring machines and more especially to horizontal milling and boring machines.

Such machines generally have a single tool carrying spindle, or two parallel spaced spindles and consequently it is not possible with such machines to machine work otherwise than along a single axis and in a single plane normal to such axis. When, with such a machine, it is desired to work along more than one axis and/or more than one plane, it becomes necessary either to displace the work to bring it to a suitable position with respect to the tool, or to mount an auxiliary head which is provided with countergearing therein, on the front face of the headstock or the spindle carrying slide of the machine.

The first mentioned procedure i.e., displacing the work, obviously results in a considerable loss of time and is detrimental to the attainment of high precision in the machining work.

The auxiliary heads used in the second procedure mentioned above, in their most elaborate form, may include two tool carrying spindles, namely a longitudinal spindle parallel to the spindle of the machine or in alignment therewith, and a second spindle normal to the first and sometimes provided with means for securing tools at either end of it. With such auxiliary heads therefore it becomes possible to machine work along three mutually perpendicular axes or in three perpendicular planes without having to remove the work to alter its orientation, by simply rotating the auxiliary head about a longitudinal axis coincident with or parallel to the axis of the main spindle of the machine.

It should be observed that such auxiliary heads should be so designed as to be readily and easily mounted and dismounted without entailing difficulties in handling and adjustment, otherwise the resulting excessive losses of time in shop operations would make it preferable to use some other procedure, such as, for example by displacing the work. Hence, such auxiliary heads must necessarily be of comparatively small-size and the tool carrying spindles provided on them must have much smaller dimensions in both length and cross section, than those of the main spindle of the machine. The disadvantage of such constructions is that the machining work performed with such heads can only use a fraction of the full drive power that is available for the main spindle of the machine.

The net result is that when a boring and milling machine is rigged with an auxiliary head to work in three mutually normal planes, its output capacity is greatly reduced. Moreover, when it is desired to change back to the full available power by using the main spindle, it is necessary to dismantle the auxiliary head and thus waste production time.

An object of this invention therefore is to provide a milling and boring machine which will be free of the above described drawbacks of conventional types of such machines.

To this end, according to one important feature of the invention, the part of the headstock through which extends the conventional milling and boring spindle, e.g. the horizontal spindle of an horizontal milling and boring machine, is projected out of the machine, is constructed in the form of a headstock section pivotally mounted about the axis of the spindle and has journalled therein a secondary rotary tool-carrying spindle normal to the first or primary spindle so as to be able to assume two mutually normal positions depending on which of two corresponding angular positions is imparted to the rotatable section of the headstock means being provided in the stationary part of the headstock and in the rotatable section for driving the said secondary or orientable spindle in either of its positions.

According to another feature of the invention the secondary or orientable spindle has both ends projecting beyond the piovtal headstock section.

In one embodiment, one at least of the projecting ends of the orientable spindle has a similar configuration to the end of the conventional first spindle, especially as regards the means for securing tools and tool carriers thereto.

According to another feature of the invention the means for driving the secondary spindle in rotation comprise a drive shaft journalled in the pivoted headstock section and connected with said secondary spindle and adapted to be drivingly coupled with either one of two power takeoff shafts mounted in the main or stationary part of the headstock and driven from any suitable power source.

In a particular construction, the kinematic chain or drive path from the power source to one of these takeoff shafts serving to drive the secondary spindle includes drive components mounted in a casing removably secured to the headstock so as to allow its being removed when necessary during the periods in which the secondary spindle is being driven from the other take-off shaft.

In one form of construction the pivoted headstock section is arranged to be latched in an accurately indexed angular position in each of its angular positions by means of a latching device including elements carried by the stationary headstock section and others carried by the pivoted section.

In one embodiment of this latching device for latching the pivoted section to the stationary headstock section, there is provided a slideblock movable along a slideway of the headstock parallel to the axis of the first spindle and adapted for engagement between two stops, preferably adjustable, and carried by the pivoted section on each face of the latter which is directed towards the slideblock in the two corresponding angular positions of said pivoted section of the headstock.

In accordance with another feature of the invention, the pivoted section is provided with an auxiliary tool-carrying spindle parallel to the first spindle and adapted for connection with a motor which preferably is the same motor as that driving the first two spindles, by way of a kinematic drive chain providing for a wider range of speed ratios than that for either of the first two spindles.

In accordance with a further feature, a surfacing plate may be mounted on the first spindle and include a tool carrier adapted for radial traverse displacement across the plate by way of a differential device supported on the pivoted section and driven from an intermediate lay shaft mounted in said section and adapted to be connected with a primary drive shaft mounted in the stationary headstock and driven from any suitable source of power.

In one embodiment of this surfacing plate, rotational drive is imparted thereto by means of a pinion or gear secured to the auxiliary spindle and meshing with a gear annulus on the plate.

A better understanding of the invention will be had from a perusal of the ensuing description when read with reference to the accompanying drawings in which an embodiment of the invention is disclosed by way of illustration but not of limitation.

In the drawings:

FIGURE 3 is a vertical section generally on the broken line III—III of FIGURE 2;

FIGURE 4 is a vertical section on line IV—IV of FIGURE 3;

FIGURE 5 is an horizontal section on line V—V of FIGURE 4;

FIGURE 14 is an horizontal section on line XIV—XIV of FIGURE 12 and

Figure 1:
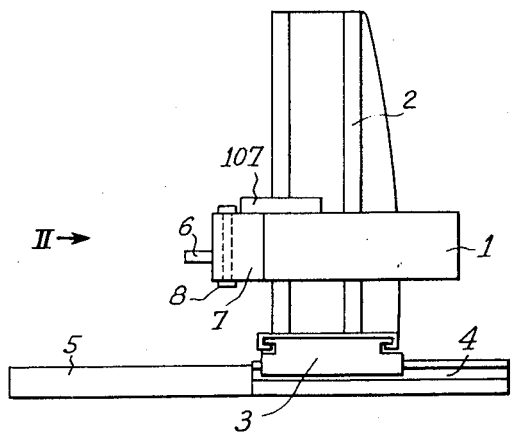
FIGURE 1 is an outline view of a milling and boring machine having a plurality of perpendicularly related spindles in accordance with the invention.

Referring first to FIGURE 1, there is shown in outline an horizontal boring and milling machine which may generally be of any conventional type, and which may for example include, as shown, a headstock 1 vertically displaceable on a standard 2 which is slidable along a bed 3 that is in turn slidable on a ways 4 extending normally to the general direction of the bed 3. The work is secured on a bedplate 5 and the tool, which may be a milling cutter or a boring or reaming tool or the like, is carried by a horizontal rotary spindle 6 journalled in the headstock so as to be axially slidable therein.

The basic feature of the milling and boring machine of the invention lies in the fact that the headstock 1 includes a part 7 which herein is termed the pivoted or rotatable section, which is pivotable about the axis of the main or primary spindle 6 of the machine and which carries a secondary spindle 8 normal to the primary spindle 6. The pivoted section 7 of this embodiment is substantially similar in cross sectional shape to the remainder of the headstock. The spindle 6 is therefore able to extend through the pivoted section 7, whereas the latter may assume either of two angular positions, namely, a position in which the orientable spindle 8 is vertical and a position in which spindle 8 is horizontal. Thus, the machine is seen to have one spindle 6 which is always horizontal and another, orientable, spindle 8 which can either be made to be horizontal and normal to spindle 6, or vertical. With such a machine it will be possible to machine work in all three dimensions of space, or in three mutually perpendicular planes, without having to displace the work. Moreover the machine is so designed that each of its two spindles is able to operate with the full drive power available in the machine.

Figure 7:
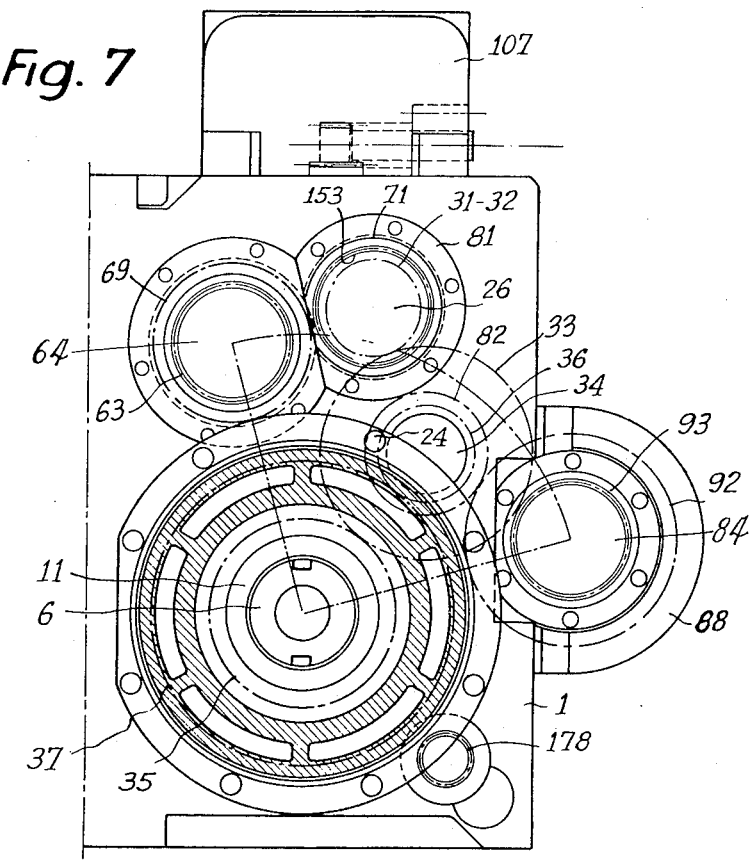
FIGURE 7 is a vertical section on line VII—VII of FIGURE 3.

The horizontal spindle 6 of the machine is slidably mounted in a rotary sleeve 11 (FIGURE 3) and is connected with it for rotation by keyways 12. The rotary sleeve 11 is supported at its forward end in two taper roller bearings 13 and 14, it is also supported at an intermediate point of its length in a dual taper roller bearing 15 and also at its rear end in a cylindrical roller bearing 16. This latter bearing is mounted directly in a bore 17 of the relatively stationary part, or body, of headstock 1, while the other two roller bearing means mentioned above are mounted in bores 18 and 19 of a cylindrical support 21 coaxially mounted in a bore 22 in the relatively stationary part, or body, of headstock 1 and is secured thereto by way of a ring 23 in FIG. 3 press-fitted around the cylindrical support and in turn secured to the headstock body with screws 24 (FIGURE 7).

The sleeve 11 may be rotatably driven from a variable speed electric motor M (FIGURE 5) or a constant-speed (e.g. synchronous) motor provided with a gear-box, or any other variable speed drive system. The motor M in FIG. 5 rotates a shaft 26 which is journalled in the bearings 27, 28 mounted in a sleeve 29 that is secured in the body of headstock 1. The shaft 26 is connected with the rotary sleeve 11 through gearing capable of imparting two different drive ratios. For this purpose shaft 26 has two sets of gear teeth 31, 32 (FIGURE 5) of equal diameter formed on it and selectively engageable by a gear 33 (FIGURES 3 and 7) slidably and rotatably mounted on a shaft journalled in the body of headstock 1 and the longitudinal geometrical axis of which is indicated in FIG. 3 by the broken line 34. The gear 33 in one position meshes both with the gear 32 and with a gear 35 (see FIGURES 3 and 7) integral with the sleeve 11. When the gear 33 in another position meshes with the gear 31 a gear 36 integral with the gear 33 will mesh with a gear 37 connected with the sleeve 11. In the drawings the sliding gear or selector unit formed by both gears 33 and 36 is shown in a neutral position in which the drive is disengaged.

The pivoted section 7 is centered around a frustoconical part of the ring 23 (see FIGURE 3) by way of a frustoconical ring 38 secured to said pivotal section 7 through screws 39 (FIGURE 8) only the geometrical axes of which are shown in FIGURE 3. Owing to the simultaneous bearing engagement of the frustoconical side surfaces and the flat end surfaces of the rings 23 and 38 there is provided a pivotal mount for the section 7 on the body of headstock 1 which is both clearance-free and free-running.

The front part of pivotal section 7 is centered by means of a ring 42 which is secured thereto by screws, not shown, and is directly rotatable, with a small amount of clearance, on the front end of cylindrical support 21. A circular plate 43 secured to the cylindrical support with screws 44 is freely supported against the end face of ring 41. Screws 45 (also see FIGURE 2) extend through the plate 43 and engage the ring 41 to provide a longitudinal block for the pivotal section 7 against the cylindrical support 21 and hence against the body of headstock 1 rigidly connected therewith.

The orientable spindle 8 (FIGURE 4) is mounted in the pivotal section 7 by way of roller bearings 47, 48 and 49. It is formed in two parts for convenience of assembly, and its ends 51 and 52 are each formed in a conventional manner for receiving standard tools therein, both these tool receiving ends being formed similarly as between each other and similarly to the end 53 in FIG. 3 of the rotary sleeve 11.

Figure 8:
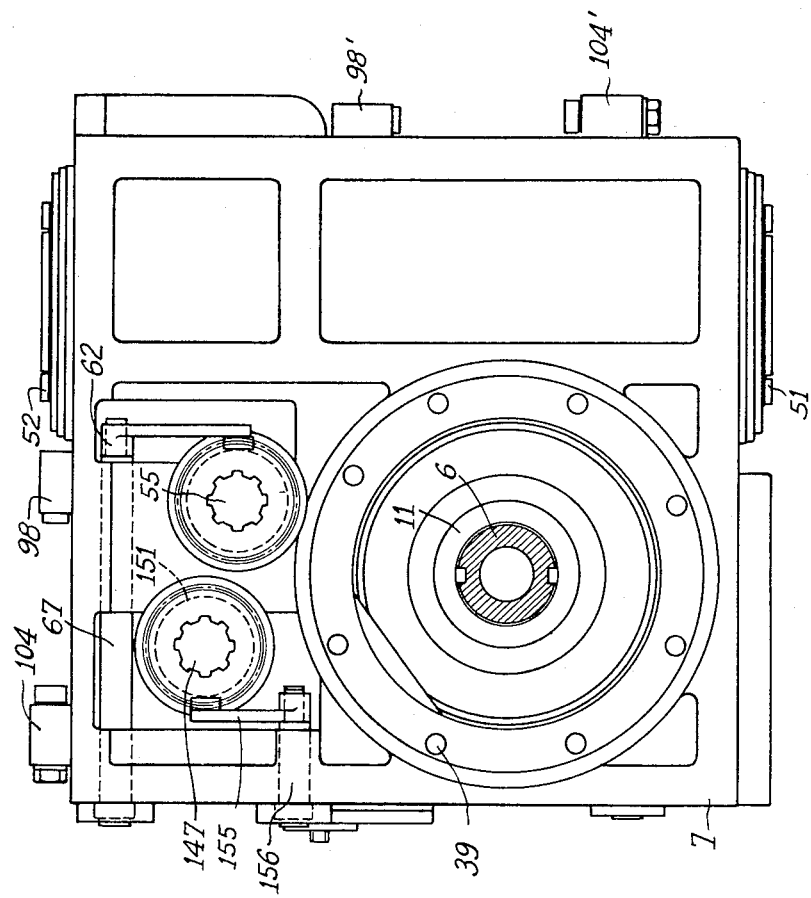
FIGURE 8 is a rear view of the front pivoted section of the headstock as seen in the reverse direction from that indicated by arrows VII—VII in FIGURE 3.

The orientable spindle 8 is driven in rotation by a worm-gear 54 secured to it and meshing with a worm 55 supported in roller bearings 56, 57, 58 (FIGURES 3 to 5) mounted in the pivotal section 7. Worm 55 carries a sleeve 61 formed with keyway means and formed with gear teeth which are adapted to be moved by means of a fork clutch member 62 (also see FIGURE 8) into meshing engagement with an internal gear annulus 63 in FIG. 5 integral with a shaft 64 mounted in two taper roller bearings 65, 66 in the body of headstock 1. The operating shaft 67 for clutch fork 62 is shown in FIGURE 8. The shaft 64 is positioned in accurate alignment with the axis of worm 55 when the pivotal section 7 is in the position shown in FIGURES 1 to 9 in which the orientable spindle 8 is vertical.

The orientable spindle 8 may be driven in rotation through the worm gear 54, worm 55 and a gear 69 secured to the shaft 64a from the afore-mentioned motor M (FIGURE 5) by way of a dual kinematic drive chain providing two different drive ratios.

The first one of these kinematic drive chains or paths includes a gear 71 constantly meshing with gear 69 and secured to a shaft 72 which is journalled in coaxial alignment with shaft 26 by two taper roller bearings 73, 74 provided in headstock 1. The shaft 72 may be rotatably driven by shaft 26 through a coupling comprising a sleeve 75 slidably keyed on shaft 72 and carrying an internal gear annulus 76 adapted to mesh with an external set of gear teeth provided on a sleeve 77 secured to shaft 26. Shaft 26 is driven from motor M as previously indicated.

The second above mentioned drive path also comprises the gear 71 and shaft 72 and thereafter includes a gear 81 secured to sleeve 75 and adapted to mesh with a gear 82 (also see FIGURES 3 and 7) secured to shaft 34. Thus, when sleeve 75 is positioned so that gear annulus 76 is disengaged from sleeve 77, shaft 72 is driven from motor M by way of the drive chain comprising: shaft 26, gear 32, gear 33, shaft 34, gear 82 and gear 81.

In the foregoing description the position of the orientable spindle 8 was assumed to be vertical. If now the section 7 is rotated 90° about the axis of horizontal spindle 6 so as to bring it to the position shown in FIGURES 10 to 14 the orientable spindle 8 will assume a horizontal position in a direction normal to such vertical position and to that of spindle 6.

Figure 10:
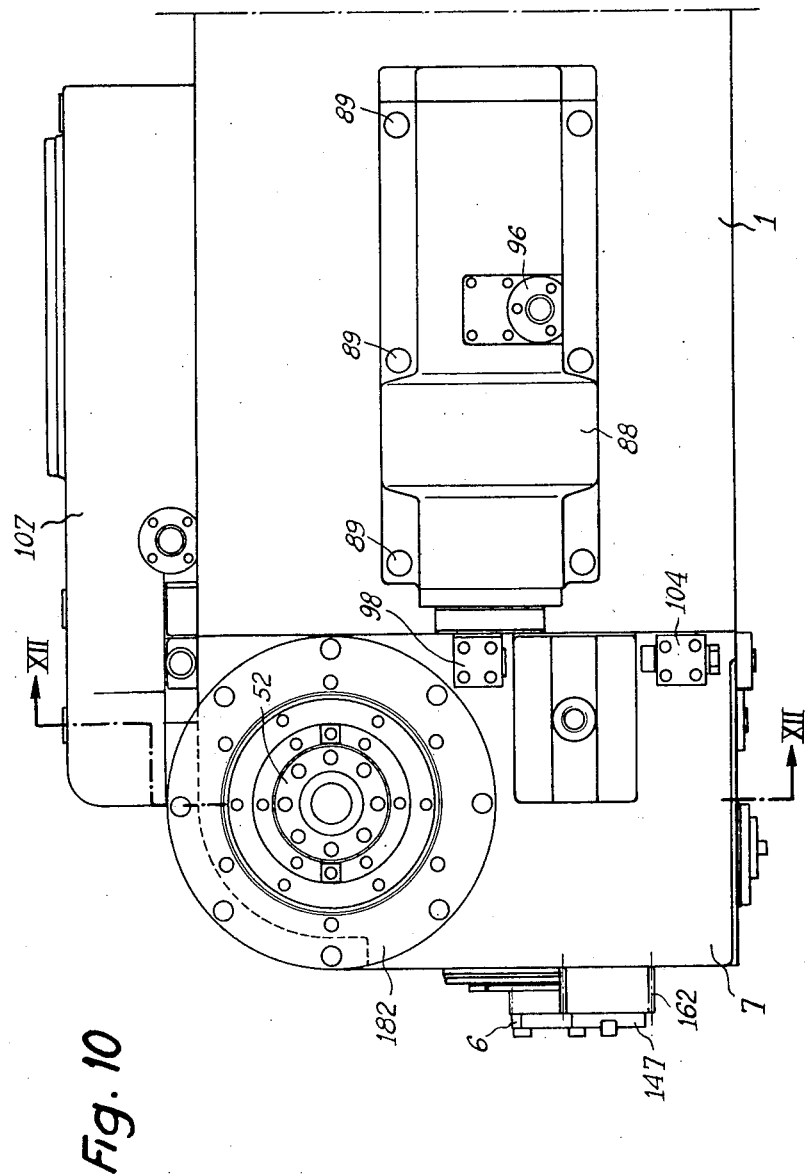
FIGURE 10 is an elevational view in the same viewing direction as FIGURE 3 but with the spindle of the pivoted section shown in its horizontal position.

In this horizontal position the orientable spindle 8 is obviously still in driven relation with worm gear 54 and worm 55 but the latter is now driven through different means than when in the vertical position. This sleeve 61 slidably keyed on the worm shaft now has its gear teeth engageable with the inner gear teeth of a sleeve 83 (FIGure 14) secured to one end of a shaft 84 which is supported in bearings 85, 86, 87 mounted in a casing 88 removably secured to the side of headstock 1 with screws 89 (FIGURE 10).

Figure 15:
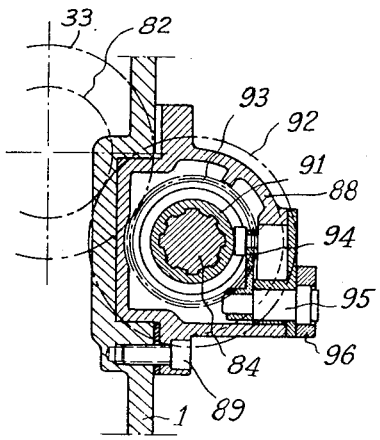
FIGURE 15 is a partial section on line XV—XV of FIGURE 14.

Slidably keyed on shaft 84 (FIGURE 14) is a sleeve 91 secured to two gears 92, 93 adapted to be brought into respective meshing engagement with the gears 82 and 33 by means of a fork selector 94 (see also FIGURE 15), the latter of which is secured to a spindle 95 carrying an operating knob 96. The spindle 8 when in its horizontal position is therefore driven in rotation from motor M by way of: shaft 26, gear 32, gear 33, gear 93 (or shaft 34, gear 82 and gear 92) thence shaft 84, coupling 83—61, worm 55 and worm-gear 54.

To assure high accuracy in the angular positioning of the spindle 8 in each of its horizontal and vertical positions, the section 7 is provided with indexing or latching means comprising a fixed stop 98 (FIGURE 4) secured to the pivotal section 7 and having an associated adjusting shim 103, and a screw 101 provided with a swivel mount 102 and engaging through an adjusting shim 99 an abutment 104 also secured to section 7. The shim 99 and swivel 102 are respectively in engagement with two supporting parts 105, 106 (also see FIGURE 11) secured to a slideblock 107 by screws diagramatically indicated at 108 in FIGURE 11. The stops 98 and 104 are secured to the section 7 each by way of screws 109 (FIGURE 11) and a key 111 (FIGURE 4).

Figure 11:
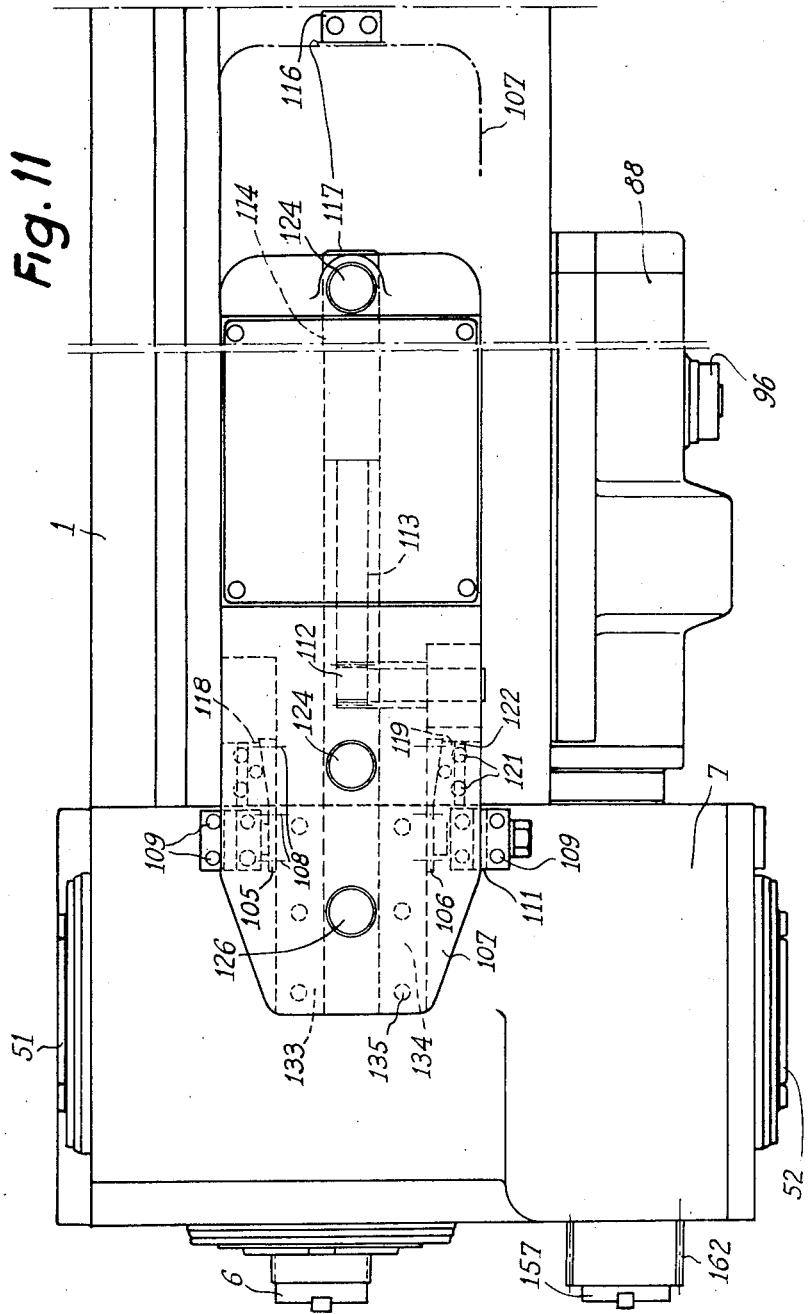
FIGURE 11 is a plan view of the construction shown in FIGURE 10.
Figure 12:
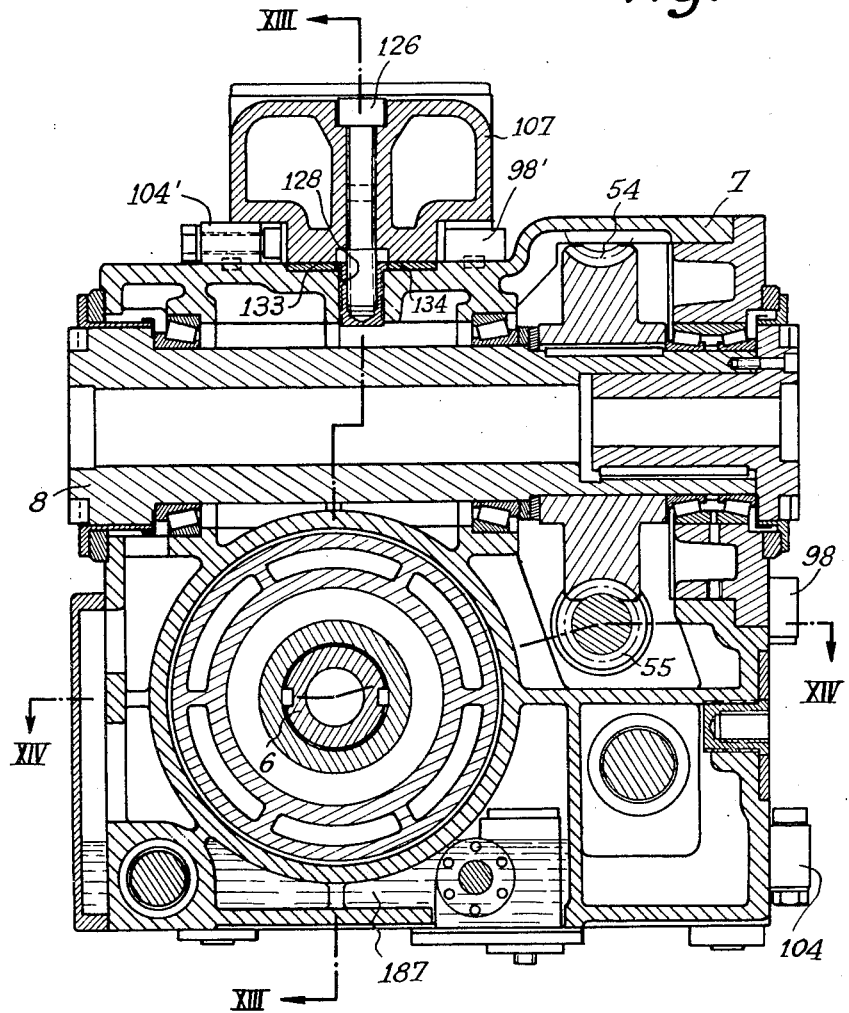
FIGURE 12 is a vertical section on line XII—XII of FIGURE 10.
Figure 13:
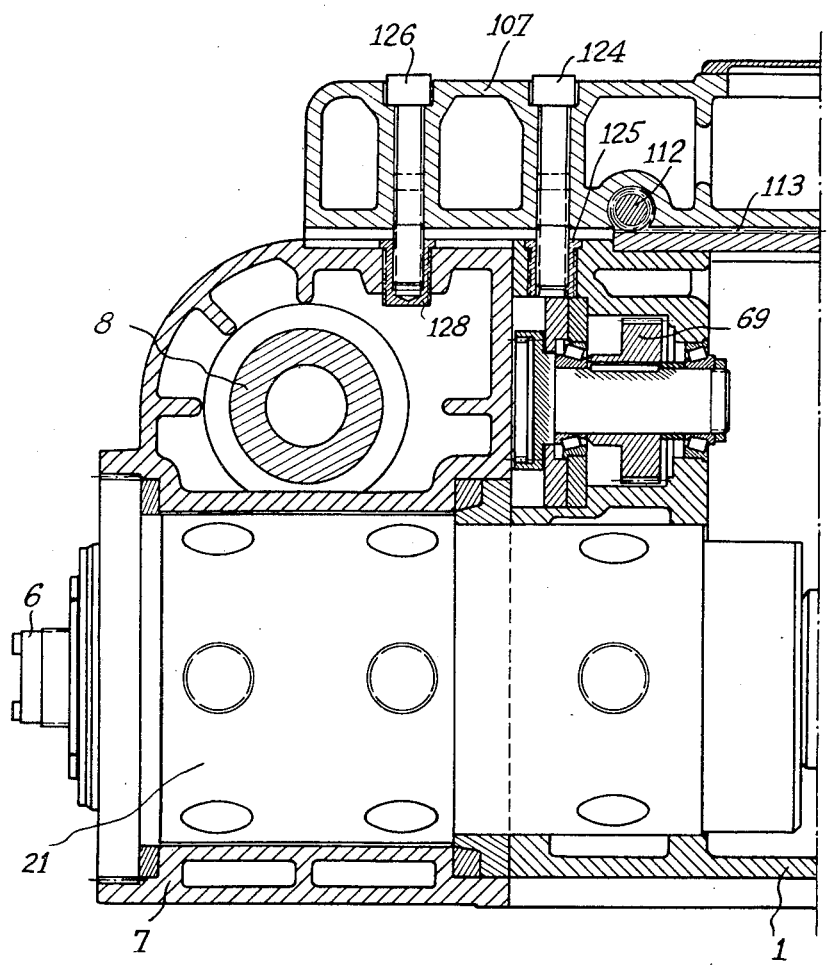
FIGURE 13 is a vertical section on line XIII—XIII of FIGURE 12.

The slide-block 107 may be advanced over the section 7 as shown in FIGURES 3, 4, 6, 10, 11, 12 and 13 for latching it in either of its two angular positions or it may alternatively be completely retracted along the headstock as shown in chain lines in FIGURE 11 to permit rotation of the section 7.

The slideblock 107 can be shifted by way of a gear 112 (FIGURES 3 and 11) journalled in the slideblock and meshing with a rack 113 secured to the upper side of headstock 1. The slideblock is guided by the sides of the rack and a longitudinal feather 114 secured to the headstock, both these parts being received in a groove 115 of the slideblock. A stop 116 secured to the upper side of headstock 1 limits the rearward travel of the slideblock by engagement with a boss 117 on the latter (FIGURE 11).

The forward limit of travel of the slideblock is defined by engagement of inclines on the supporting parts 105, 106 secured to the slideblock with corresponding inclines on two blocks 118, 119 each of which is securely connected to the headstock by a pair of screws 121 and a key 122.

The face of section 7 adjacent spindle 8 is further provided with stops 98' and 104' (FIGURES 2 and 4) which are arranged in a manner similar to that described for stops 98 and 104 to enable the slideblock 107 to latch the assembly 7 in position when the spindle 8 is horizontal. Thus, in each of its two angular positions the section 7 and hence the spindle 8 is locked firmly and without play.

Further, the slideblock 107 is adapted to be firmly secured on the one hand to the top of the headstock 1 by means of two screws 124 (FIGURES 3 and 11) threaded in steel bushings 125 which in turn are permanently screwed into the headstock, and on the other hand to the top of the pivotal section 7 by means of a screw 126 which is threadable into a bushing 127 in FIGS. 3 and 4 when the section is in that position in which spindle 8 is vertical, and into a bushing 128 (FIGURES 4 and 13) when the section is in the position in which spindle 8 is horizontal, both bushings 127 and 128 being secured to section 7.

Figure 9:
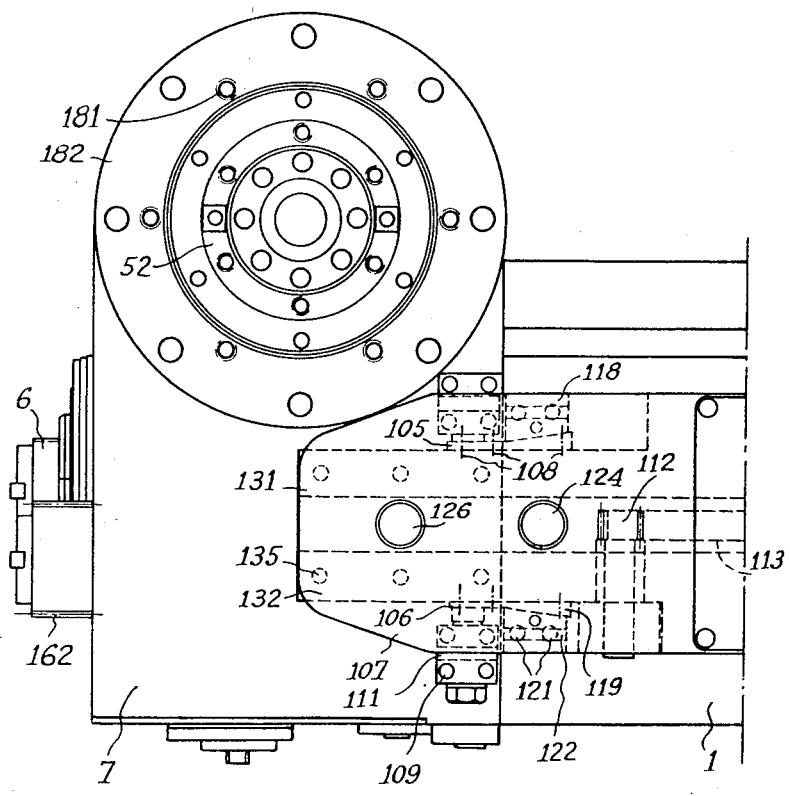
FIGURE 9 is a partial plan view of the front part of the headstock corresponding to FIGURE 3.

To ensure that the distances from the pivotal axis of section 7 to each of the sides of the section against which the slideblock 107 bears will be exactly equal, shims 131, 132, 133, 134 of appropriate thickness (FIGURE 4) are secured to those faces with screws 135 (FIGURES 9 and 11).

To avoid the necessity of having to remove the screws 124 and 126 completely when it may be required to shift the slideblock 107, the holes in the slideblock receiving the screws each include a portion 136 (FIGURES 3 and 4) of smaller diameter tapped with a screw pitch corresponding to that of the screws, whereby the screws may be backed off so as to be engaged a small amount into these tapped portions whereupon their ends are retracted above the upper plane of head stock 1 and section 7.

Figure 6:
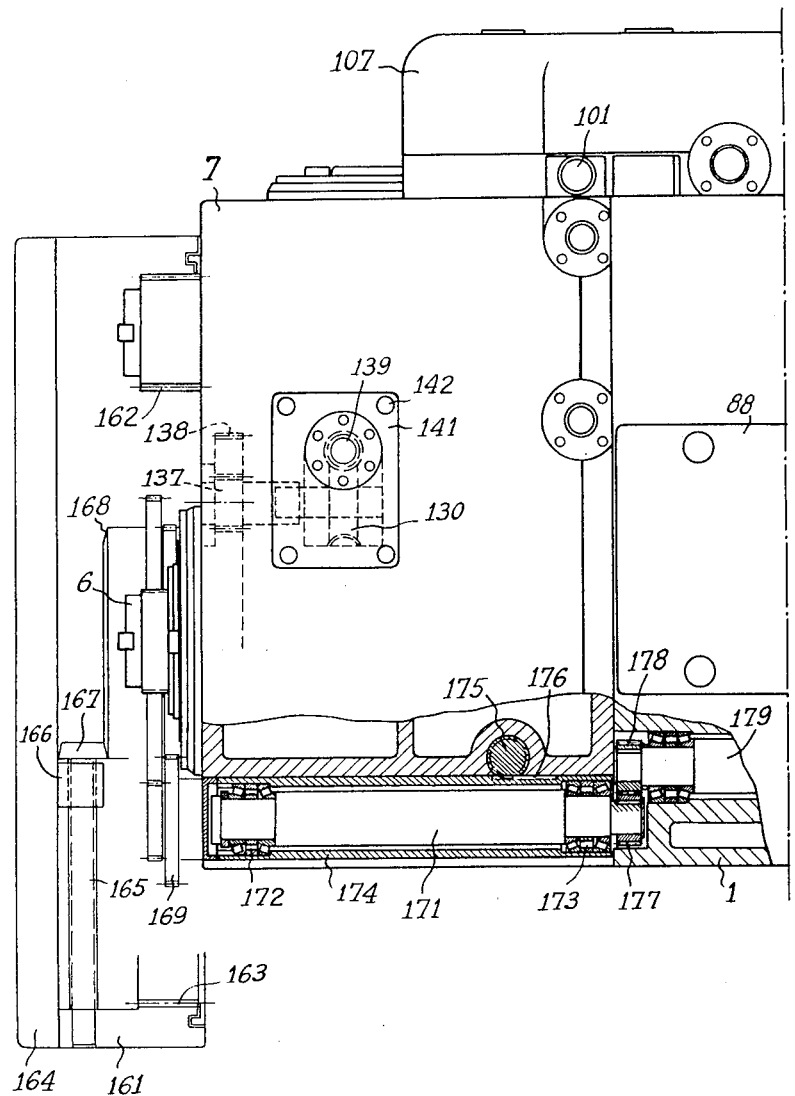
FIGURE 6 is a vertical section on line VI—VI of FIGURE 4; and including a face plate attachment.

The section 7 may be rotated by the use of means which includes a gear 137 (FIGURE 6) meshing with gear teeth 138 formed at the edge of plate 43 (also see FIGURES 3, 4 and 6). The gear 137 is integrally connected with a worm-gear 130 (FIGURES 4 and 6) meshing with a worm 139 terminating at its outer end in a square portion 140 and mounted in a casing 141 secured to the section 7 with screws 142. An index mark 143 (FIGURE 2) engraved on the end face of section 7 is positioned in alignment with one or the other of two other index marks 144 and 145 in FIG. 2 engraved on the fixed plate 43 according to the angular position assumed by the section 7, thereby facilitating the crude angular positioning of the section, whereafter fine angular adjustment is effected by using the slideblock 107.

The machine further includes an auxiliary horizontal spindle 147 (FIGURE 5) which is supported in bearings 148 and 149 provided in the section 7, and adapted to be driven in rotation when the section 7 assumes the position in which the orientable spindle 8 is vertical. For this purpose a sleeve 151 is slidably keyed on the horizontal auxiliary spindle 147 and is provided with an external set of gear teeth 152 adapted to mesh with the inner gear teeth 153 of a sleeve 154 secured to the shaft 72, the latter of which is in accurate alignment with the spindle 147 when the section 7 assumes its abovementioned position. The sleeve 151 can be shifted by means of a shifter fork 155 (FIGURE 8) secured to a shaft 156 operable from outside the machine.

The auxiliary horizontal spindle 147 is thus associated with means capable of effecting two different speed ranges, namely, a high-speed range which is obtained by direct coupling of the spindle with the variable-speed motor M driving the main horizontal spindle 6 through couplings 152, 153 (FIGURE 5) and 76, 77, and a low-speed range which is produced from the same motor by way of gears 32, 33, 82, 81 (FIGURE 7), shaft 72 and coupling 152, 153 (while coupling 76, 77 is disengaged).

The auxiliary horizontal spindle 147 is provided at its end with conventional means for attaching tools and tool carriers thereto, such as a taper 157 and tapped holes 158, similarly to the main horizontal spindle 6.

FIGURE 6 illustrates a surfacing disc or plate 161 mounted on the main spindle 6 (which at such time is in declutched condition) and driven in rotation through a gear 162 formed on the end of the auxiliary horizontal spindle 147 and meshing with an inner gear annulus 163 secured to the surfacing disc. The surfacing disc may thus be driven at two different speed ranges inasmuch as it is driven from the auxiliary spindle 147.

The radial feed movement of the carriage 164 across the surfacing plate is accomplished by conventional means which include a screw 165, nut 166, bevel gear 167, bevel gear 168 and a differential device 169 that is driven from a shaft 171 journalled in spaced bearings 172, 173 which are mounted in a cylindrical casing 174 adapted for longitudinal sliding displacement in the section 7 in a direction parallel to the axis of the main spindle 6. The casing 174 may be shifted by means of a shaft 175 which is mounted in the section 7 normally to the casing 174 and a part of which is formed with gear teeth that mesh with a rack 176 formed in said casing.

In the position shown in FIGURE 6, the casing 174 is retracted to enable the gear teeth 177 provided on the inner end of shaft 171 to mesh with another gear 178 secured to a shaft 179 journalled in the body of headstock 1. Shaft 179 is driven from a separate motor which may be a variable speed motor or a constant speed motor with an associated gearbox. This drive may be conventional and is therefore not illustrated.

Prior to rotating the section 7 the gear teeth 177 are disengaged by shifting the casing 174 to the left as viewed in FIGURE 6.

Figure 2:
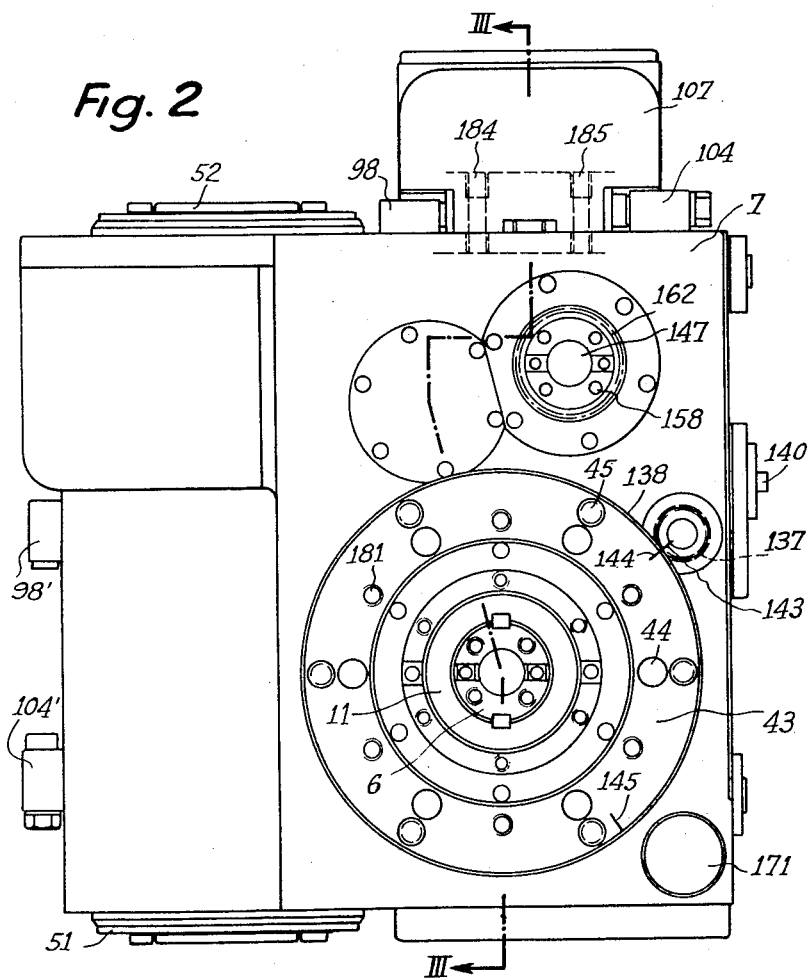
FIGURE 2 is a side view of the headstock on such machine seen in the direction indicated by arrow II in FIGURE 1, and with the orientable spindle thereof in its vertical position.

As shown in FIGURES 2, 4 and 9, identical and similarly disposed holes 181 are formed both in the plate 43 secured to the pivotal section 7 of headstock 1 and in a housing 182 secured to the pivotal section 7 around the orientable spindle 8. These holes surrounding both spindles of the machine make it possible to secure thereto similar machining attachments. Thus the arrangement shown makes it possible to perform the same machining operations with both spindles, and with application of the full power available for the machine to each spindle.

The revolving parts in section 7 are lubricated from a separate pump 183 (FIGURE 3) mounted within the slideblock 107. The intake and delivery pipe sections positioned within the slideblock and within the pivotal section are interconnected by way of two openings 184, 185 (FIGURE 2) provided with sealing means in the plane of the shims 131 and 132 or 133 and 134.

A portion 186 (FIGURE 4) or a portion 187 (FIGURE 12) of the pivotal section 7 is adapted to function as an oil reservoir for the lubricating system according as the section is in one or the other of its angular positions. A two-way intake valve, not shown, is provided for drawing oil out of either of these portions depending on the position of the section 7.

Various modifications may be made in the embodiment illustrated and described. Thus the invention is applicable both to milling and boring machines of the type wherein the headstock is directly mounted on a standard, as shown here, and to such machines wherein the headstock is horizontally movable over a carriage which in turn is slidable vertically on a standard.

I claim:

1. A milling and boring machine including a headstock composed of a stationary section and a rotatable section arranged in alignment, a primary tool-carrying spindle journalled in the headstock and projecting from the rotatable section thereof, drive means for rotating said spindle with full power of the machine, means supporting said rotatable section for rotational movement about the geometric axis of said spindle, a secondary tool-carrying spindle journalled in said rotatable section for rotatable movement about an axis orthogonal to that of the primary spindle, means operable to rotate said rotatable headstock section to any one of a plurality of predetermined angularly displaced positions, and drive means for rotating said secondary spindle in any of said angular positions of the rotatable headstock section, said secondary spindle drive means being operable to transfer to said secondary spindle at any one of said angular positions the full power of the machine alternately available at the primary spindle.

2. A machine according to claim 1, wherein the secondary spindle projects at both ends beyond the rotatable headstock section, and including tool-carrying means at both ends of said secondary spindle.

3. A machine according to claim 1, wherein at least one end of said secondary spindle projects from said rotatable section, and including identical tool carrying means provided on at least one projecting end of said secondary spindle and on the outer end of the primary spindle.

4. A machine according to claim 1, wherein the drive means for the secondary spindle comprise a pair of movement take-off shafts journalled in a stationary section of the headstock and a drive shaft journalled in said rotatable headstock section adapted to be coupled in driving engagement with either of said take-off shafts.

5. A machine according to claim 4 wherein said first and second mentioned drive means are driven from a common motor, said first mentioned drive means connecting said primary spindle in driven relation to said common motor through a first drive path and said second mentioned drive means connecting said secondary spindle in driven relation to said common motor by way of either one of two further drive paths respectively including said take-off shafts, both of said drive means being capable of transmitting the full power of said common motor to said spindles through all three of said paths.

6. A milling and boring machine including a headstock composed of a stationary section and a rotatable section arranged in alignment, a primary tool-carrying spindle journalled in the headstock and projecting from the rotatable section thereof, drive means for rotating said spindle, means supporting said rotatable section for rotational movement about the geometric axis of said spindle, a secondary tool-carrying spindle journalled in said rotatable section for rotatable movement about an axis orthogonal to that of the primary spindle, means operable to rotate said rotatable headstock section to either of two angularly displaced positions, latching means constituted of a carriage slidable on ways extending along the stationary headstock section in a direction parallel to the axis of the primary spindle, and coactable with two spaced stops provided on each of the two surfaces of said rotatable section which are engageable with the carriage in the two angular positions of the rotatable section, and drive means for rotating said secondary spindle in either of said positions of the rotatable headstock section.

7. A machine according to claim 6, wherein screw means are provided for firmly securing the carriage in latched position to the stationary headstock section and to the rotatable section in each angular position.

8. A milling and boring machine including a headstock composed of a stationary section and a rotatable section arranged in alignment, a primary tool-carrying spindle journalled in the headstock and projecting from the rotatable section thereof, drive means for rotating said spindle, means supporting said rotatable section for rotational movement about the geometric axis of said spindle, a secondary tool-carrying spindle journalled in said rotatable section for rotatable movement about an axis orthogonal to that of the primary spindle, means operable to rotate said rotatable headstock section to either of two angularly displaced positions, drive means for rotating said secondary spindle in either of said positions of said rotatable headstock section, a surfacing plate mounted on said primary spindle and comprising a radially displaceable tool-carriage, and means for radially displacing the tool carriage including a primary shaft journalled in said stationary headstock section and drivenly connected to a source of power, an intermediate shaft journalled in said rotatable headstock section and connectible in driven relation with said primary shaft, and differential gearing connected in driven relation to said intermediate shaft and connecting the latter to said tool carriage.

9. A milling and boring machine including a headstock composed of a stationary section and a rotatable section arranged in alignment, a primary tool-carrying spindle journalled in the headstock and projecting from the rotatable section thereof, drive means for rotating said spindle, means supporting said rotatable section for rotational movement about the geometric axis of said spindle, a secondary tool-carrying spindle journalled in said rotatable section for rotatable movement about an axis orthogonal to that of the primary spindle, means operable to rotate said rotatable headstock section to either of two angularly displaced positions, and drive means for rotating said secondary spindle in either of said positions of the rotatable headstock section, said drive means for said secondary spindle comprising a pair of movement take-off shafts journalled in said stationary section of the headstock and a drive shaft journalled in said rotatable headstock section adapted to be coupled in driving engagement with either of said take-off shafts, said first and second mentioned drive means being driven from a common motor, said first mentioned drive means connecting said primary spindle in driven relation to said common motor through a first drive path and said second mentioned drive means connecting said secondary spindle in driven relation to said common motor by way of either one of two further drive paths respectively including said take-off shafts, the drive path from the motor to one of said take-off shafts including drive components mounted in a casing which is removably secured to said stationary headstock section and is positively removed therefrom during periods when the secondary spindle is driven from the other take-off shaft, and both of said drive means being capable of transmitting the full power of said common motor to said spindles through all three of said paths.

10. A milling and boring machine including a headstock composed of a stationary section and a rotatable section arranged in alignment, a primary tool-carrying spindle journalled in the headstock and projecting from the rotatable section thereof, drive means for rotating said spindle, means suporting said rotatable section for rotational movement about the geometric axis of said spindle, a secondary tool-carrying spindle journalled in said rotatable section for rotatable movement about an axis orthogonal to that of the primary spindle, means operable to rotate said rotatable headstock section to either of two angularly displaced positions, drive means for rotating said secondary spindle in either of said positions of the rotatable headstock section, an auxiliary tool-carrying spindle journalled in said rotatable section in parallel and spaced relation with said second spindle, and means for driving said auxiliary spindle from motor means at a range of speeds higher than the speed range of said primary and secondary spindles.

11. A machine according to claim 10, including a surfacing plate mounted on said primary spindle, and means for rotating said surfacing plate, comprising a pinion secured to said auxiliary spindle, and a gear annulus secured to the surfacing plate and meshing with said pinion.

References Cited in the file of this patent

UNITED STATES PATENTS

| 602,291 | Klay | Apr. 12, 1898 |
| 2,682,698 | Berthiez | July 6, 1954 |
| 2,685,122 | Berthiez | Aug. 3, 1954 |
| 2,831,386 | Woytych | Apr. 22, 1958 |

FOREIGN PATENTS

| 1,155,601 | France | May 6, 1958 |